United States Patent Office 3,360,866
Patented Jan. 2, 1968

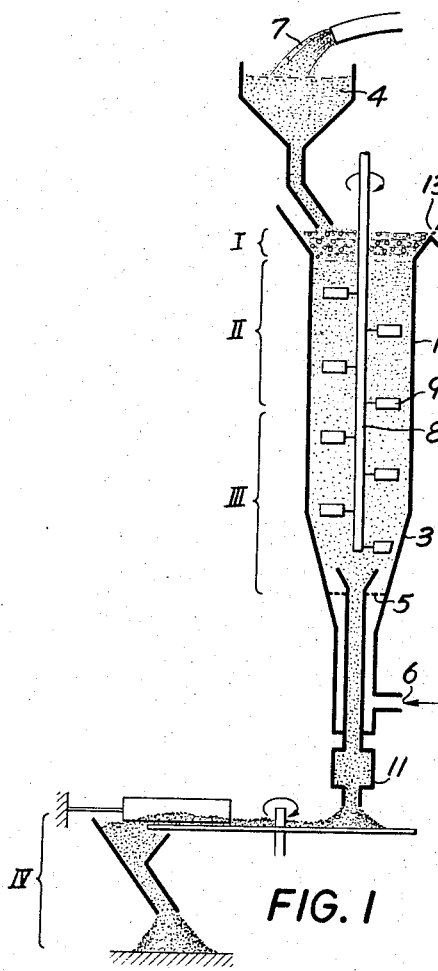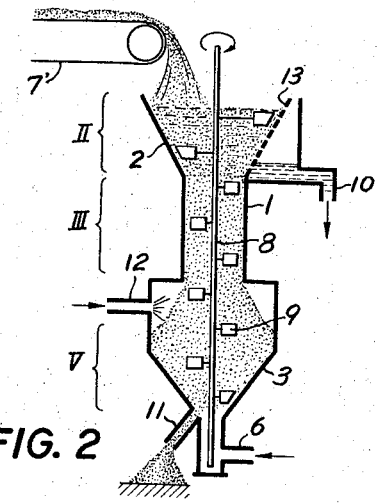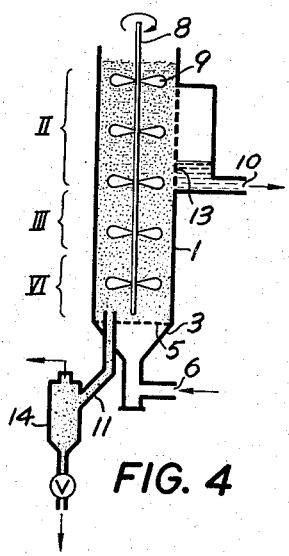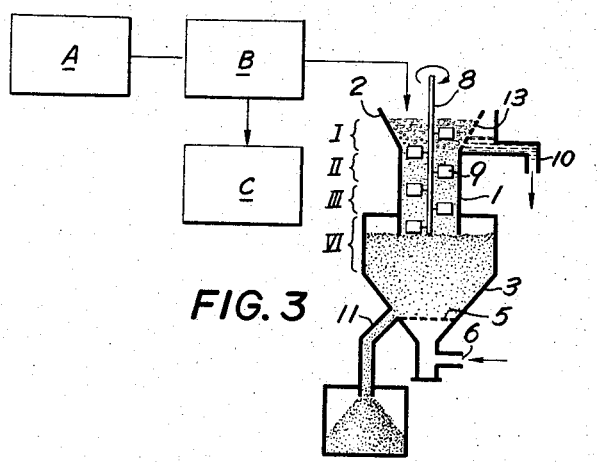

3,360,866
METHOD AND APPARATUS FOR DEHYDRATING, DRYING AND HEAT-TREATING GRANULAR SUBSTANCES
Takashi Shirai, 42–10 2-chome, Ohkayama, Meguro-ku, Tokyo, Japan
Filed May 4, 1965, Ser. No. 453,044
Claims priority, application Japan, May 8, 1964, 39/25,797
11 Claims. (Cl. 34—10)

The present invention relates to a method and apparatus for dehydrating, drying and heat-treating granular substances, and more particularly to method and apparatus wherein wet granular substances fed into the top portion of a vertical cylinder having stirring means are dehydrated, dried and heat-treated while they are stirred, by means of a counter-current contact with hot air or a combustion gas.

A fluidized-bed type drier or heat-treating device now in use appears to be effective in heat transfer capacity and convenient for continuous operation, but is disadvantageous in that the wet material to be treated can not always be fluidized smoothly.

A pan, a rotary kiln or flash drier is also used for that purpose, but they are not suited for a continuous heat-treatment of granular material in a large amount because of their poor thermal efficiency, involving high construction cost. The term "heat-treatment" is understood to include "drying," "roasting," "calcinating," "dry distillation," "carbonization" and "burning" in the description hereinafter.

The purpose of the present invention is to overcome all of the above disadvantages and to provide a dehydrating, drying and heat-treating apparatus which is simple to fabricate and handle, demonstrates high thermal efficiency, operates continuously for a long period of time and can be constructed inexpensively.

According to the present invention, solid particles of granular substance to be heat-treated are fed continuously into a vertical cylindrical tower, a working medium such as hot air and the like being supplied from the bottom of said tower and flowing upwardly. A heat treating operation is carried out continuously by mechanically stirring the bed of granular substances by suitable stirring means, and thereafter the treated granular substances are discharged continuously from the bottom of the apparatus.

In addition, liquid or water can be discharged from the upper part of the apparatus separately from the granular substance, taking advantage of the phenomenon of "flooding," which will be described more fully hereinafter. In the usual packed tower for contacting liquid and gas, there is a phenomenon called "flooding" wherein the liquid is prevented from flowing downward when the upward velocity of gas exceeds a certain value. In the usual packed tower, the contact of liquid and gas must be carried out in a condition below said flooding point, since flooding is considered to be very dangerous. If no liquid comes down through the bed of granular substances or liquid passes upwardly through the bed by "flooding" action, a dehydration process can be achieved and the subsequent heat-treating process will become very easy. A fully continuous operation of dehydration, drying and heat-treatment of wet granular materials can thus be accomplished continuously in a single apparatus.

In a vertical tower which is packed with granular substances, supplied with hot air from the bottom and stirred mechanically, the temperature distribution will become uniform in a cross-section perpendicular to the direction of flow. Moreover, the granular substances will not adhere or collect together nor will the flow of fluid be irregular. Additionally, the power for stirring is greatly reduced by ventilating upwardly, and the resistance of air flow is also reduced by the action of stirring while the thermal efficiency is increased compared to the prior art systems.

A dehydrating operation utilizing said "flooding" phenomenon in a packed tower, combined with said ventilating and stirring operation which is carried out advantageously as described hereinabove, is a main feature of the present continuous dehydrating, drying and heat-treating process.

In case said dried granular substances is inflammable, a continuous burning operation thereof will be additionally performed. That is, dehydrating, drying and burning operations will be carried out efficiently and continuously in a single apparatus.

A primary object of the present invention is to provide a drying, dehydrating and heat-treating means of granular substances wherein the temperature distribution will be substantially uniform over a cross-section perpendicular to the direction of flow of said granular substance and the power for driving stirrer can be reduced.

It is another object of the present invention to provide a dehydrating, drying and heat-treating means wherein adhesion, cohesion and uneven flow of the granular substance is entirely eliminated.

It is still another object of the present invention to provide a dehydrating, drying and heat-treating means in which the resistance to the flowing air is reduced by stirring the bed of granular substance and the power for driving the stirrer is also reduced greatly by reason of the upward ventilation.

Still another object of the present invention is to provide a dehydrating, drying and heat-treating means wherein the heat transfer capacity is greatly improved and a high thermal efficiency is obtained.

Several preferred embodiments according to the present invention will be described in detail hereinafter by way of example with reference to the accompanying drawing, in which:

FIG. 1 is a diagrammatic vertical section view showing a preferable embodiment according to the present invention used for dehydrating and drying crystallized particles;

FIG. 2 is a view similar to FIG. 1 showing another embodiment used for dehydrating and drying wet granular substances;

FIG. 3 is a view similar to FIG. 1 showing a different embodiment used for dehydrating, drying and burning barker waste water from a paper mill; and FIG. 4 is a view similar to FIG. 1 showing a different embodiment used for dehydrating, drying and burning trash.

Like reference numerals designate like components or devices throughout all the drawings.

Referring to FIG. 1, numeral 1 designates a vertical cylinder, 2 a diverging top portion of said cylinder adapted to serve as a reservoir for wet granular substance, 3 a tapered lower portion of said cylinder, 4 a hopper for receiving raw material, 5 a support consisting of gratings, perforated plates or screens located in the lower part of said cylinder and designed for supporting the granular material to be treated, 6 an inlet duct for hot air, 7 an outlet duct for liquid containing granular material such as crystals, 8 a rotating shaft located in the center of said cylinder, 9 stirring blades fixed on said rotating shaft, 10 an overflow pipe, 11 an outlet pipe for finished product, 13 a filter means such as a screen for preventing outflow of granular substance while allowing the passage of liquid. The cylinder is constituted by a part I including a mixed layer of granular substance and bubbling liquid, a part II including a dehydrating zone, a part III including a drying zone, and a part IV including a discharging zone for dried crystals. FIG. 2 shows an arrangement wherein the present device has been used for dehydrating and drying wet granular substance from its slurry. An enlarged portion in the lower part thereof is adapted to be supplied with air and fuel such as gas or oil so as to keep a burner 12 burning. A part V is a cooling zone.

FIG. 3 shows an embodiment wherein the present apparatus has been applied for dehydrating, drying and burning a barker waste liquor at paper mills. Barker waste liquor A at a paper mill contains some inflammable materials such as sawdust, wooden pieces, roots and barks and 97% of water. B designates a conveyor of the screen belt or screen basket type which is adapted to reduce the water content of said barker waste to about 80% when it is transferred to the present apparatus, and water separated at B is discharged from C. A steel cylinder, a rotating shaft and stirring blades are similar to those shown in the previous drawing. Part VI shows a combustion chamber of the dried barker waste.

FIG. 4 shows an embodiment wherein the present invention is used for burning trash. The trash which is fed into the present apparatus contains a small amount of non-inflammable granules such as sand in addition to 95% water. The present apparatus is constructed similarly to those as described hereinabove, but is provided with an ash separator 14.

Examples will be shown hereinafter wherein the aforementioned embodiments of apparatus have been used. In each of those examples, air and water have been used as gas and liquid respectively, and the following materials have been used as granular solid substance.

| Granular material: | Minimum fluidization velocity of air, $U_{mf}$, under 1 atm. 60° F., with dry particles |
|---|---|
| Sawdust | 6.7 |
| Soybean | 16.5 |
| Sand | 4.1 |

*Example 1.—Drying of sawdust*

When sawdust containing 73% of water was treated at a rate of 4.05 lbs./hr. in a test model of reduced size working at an air volume of 530 cubic foot per hour and at a rotating speed of 10 r.p.m. of the stirring blades, the water content of the sawdust at the outlet was reduced to 40–45%. In this case, an average temperature at the circumferential wall was 248° F., that of the sawdust layer 176° F., and the coefficient of heat transfer was found to be 16.4 B.t.u./ft.$^2$h. ° C.

*Example 2.—Burning of sawdust*

Sawdust containing 87% of water was dehydrated, dried and burnt at a rate of 31 lbs./hr. by said test model having a diameter of 6 inches. In order to maintain the maximum temperature of the combustion chamber below 1300° F. for the safety precaution of the components of the testing apparatus, nitrogen gas in an amount of about 10% was mixed into the inlet air which was supplied at a rate of 442 cubic feet per hour. The rotating speed of the stirrer was 75 r.p.m., the driving of which required a shaft horsepower which was increased by 22 watts as compared to that for a no load condition. Resistance to a flow of air caused by a sawdust bed of 4 feet 3 inch depth was found to be 11.5–9.3 inches of water. Judging from the temperature distribution of the sawdust bed in the test apparatus, the thickness required for cooling the hot combustion gas of more than 1112° F. to a temperature below 248° F. through contact with wet sawdust bed was found to be less than a few inches.

*Example 3.—Drying and heat treatment of crushed soybeans*

Crushed soybeans including some moisture (less than several percent) were supplied from the top of the heat-treating apparatus at a rate of 18.3 lbs./hr. at room temperature, lowered continuously while they were being heated, dried and cooled and then discharged from the bottom. In the case in which 600 cubic feet per hour of air was supplied from the bottom while stirring the bed of said crushed soybeans at a speed of 10 r.p.m., the resistance to flow of air through the bed of granular soybeans of 24 inches thickness was found to be 10.7 inches of water and the power required for stirring the granule bed was increased by 2–10 watts as compared to that for the no load condition. Air was supplied from the bottom at a temperature of 82.4° F. and was discharged from the top at a temperature of 123.8° F. Granules of crushed soybeans were heated from room temperature to approximately 140° F. in the upper part of the apparatus, to a maximum temperature of 260° F. in the middle, and cooled down to a temperature of 140° F. in the bottom and then discharged. That is, the temperature of the soybean granules is maximum in the middle of the column and lower in the top and bottom portion by direct contact with the upward current of atmospheric air. This temperature distribution shows that heat recovery can be achieved sufficiently in the heat-treating apparatus of this type.

*Example 4.—Drying of sand*

Drying was carried out continuously by heating externally and by supplying water and dry sand together at a rate of 4.4 lbs./hr. and 18.3 lbs./hr. respectively into the vertical cylinder from the top while feeding air from the bottom at a rate of 145 cubic ft./hr. and stirring at a speed of 11 r.p.m. Air enters the apparatus at a temperature of about 68° F. and is discharged therefrom at a temperature of 125° F. The maximum temperature of the sand bed was 348° F. and sand discharged from the bottom of said apparatus was at a temperature of 158° F. The pressure drop of air through the sand bed having a depth of 46 inches was 57–59 inches of water. The depth of the wet zone granule layer was found to be 10–14 inches by analyzing the data of the distribution of temperature and pressure over the whole depth of said sand bed. In the upper part of the apparatus, a bubbling liquid (water) layer of 3.2–5.2 inch depth was observed on the granule layer, including water of condensed steam coming up from below, and sand granules were suspended in said bubbling liquid layer, through which air is passed as bubbles. In this case, the average velocity of the air was relatively small, that is, about one half of the minimum fluidization velocity of the dry sand particles. Nevertheless, a continuous operation of flooding, dehydrating and drying was achieved very smoothly.

It is to be understood that the invention is not limited to the specific embodiment herein illustrated and described, but may be used in other ways without departing from its scope and other changes can be made which would come within the scope of the invention which is limited only by the appended claims.

What is claimed is:

1. A method for dehydrating, drying and heat treating a wet granular substance, said method comprising introducing a solid granular substance in a liquid into a vertical chamber at the top thereof, introducing a gaseous substance at an elevated temperature at the bottom of the chamber such that the gaseous substance flows upwardly in the chamber and comes into direct countercurrent contact with said granular substance, said gaseous substance being supplied to said chamber at a sufficiently high rate relative to that of the granular substance to prevent downflow of the liquid in the chamber and produce flooding of the liquid at the top of the chamber, separating the liquid from the granular substance and removing the liquid from the chamber, said flooding being effected in a relatively narrow zone at the top of the chamber, the granular substance being dried and heat treated as it flows downwardly in the chamber beneath the zone of flooding in the form of a densely packed bed.

2. A method as claimed in claim 1 comprising slowly stirring the contents of the chamber to promote the downwardly flow of the granular substance and facilitate the upward flow of the gaseous substance.

3. A method as claimed in claim 2 wherein said granular substance includes combustible material and the heat treating comprises heating the combustible material by the gaseous substance to a level at which the combustible material burns.

4. A method as claimed in claim 3 wherein the burning of the combustible material is effected in a second chamber located beneath the first said chamber, the material in the second chamber being free of the stirring in the first chamber.

5. Apparatus for dehydrating, drying, and heat-treating granular substances, said apparatus comprising a substantially vertical vessel having an upper and lower end, means for supplying a granular substance with a liquid at the upper end of the vessel, means for supplying a gaseous substance at elevated temperature at the lower end of the vessel at a sufficiently high rate to flow in countercurrent contact with the granular substance and prevent downflow of the liquid accompanying the granular substance such that the liquid undergoes a flooding condition at the upper end of the vessel, filter means at said upper end of the vessel for the passage of liquid therefrom while retaining the granular substance in the vessel, the thusly dehydrated granular substance being dried and heat-treated as it flows downwardly in the vessel in the form of a densely packed bed, and means for recovering granular substance at the lower end of the vessel.

6. Apparatus as claimed in claim 5 comprising means in said vessel for slowly stirring the granular substance therein to promote its downward flow and facilitate upward flow of gaseous substance.

7. Apparatus as claimed in claim 5 wherein said vessel is constituted by a plurality of zones in superposed vertical succession in the following order from top to bottom, flooding zone, drying zone and heat treating zone.

8. Apparatus as claimed in claim 7 comprising means in said heat treating zone for burning combustible material in the granular substance.

9. Apparatus as claimed in claim 8 comprising cooling means in the vessel beneath the heat treating zone for cooling the burned material in a cooling zone.

10. Apparatus as claimed in claim 7 comprising a second vessel beneath the first said vessel and in communication therewith, said second vessel including a gaseous substance inlet means for supplying gaseous substance at a sufficiently elevated temperature to produce combustion of any combustible material in the granular substance in said second vessel.

11. Apparatus as claimed in claim 5 wherein said vessel comprises a gaseous substance outlet means constituted by a single outlet at the upper end of the vessel.

References Cited
UNITED STATES PATENTS

| | | | |
|---|---|---|---|
| 2,335,732 | 11/1943 | Bowen. | |
| 2,474,833 | 7/1949 | Eweson | 34—168 X |
| 2,635,949 | 4/1953 | Fenske et al. | 34—57 X |
| 2,709,674 | 5/1955 | Bergstrom | 34—57 X |
| 2,821,375 | 1/1958 | Andrews | 263—26 |
| 3,035,823 | 5/1962 | Harpster | 263—29 |
| 3,075,298 | 1/1963 | Schaub | 34—57 X |
| 3,142,480 | 7/1964 | Azbe | 263—29 |

FREDERICK L. MATTESON, JR., *Primary Examiner.*

D. A. TAMBURRO, *Assistant Examiner.*